March 16, 1948.   W. P. LEAR   2,438,061
REMOTE POSITIONING CONTROL
Filed Sept. 27, 1943   2 Sheets-Sheet 1
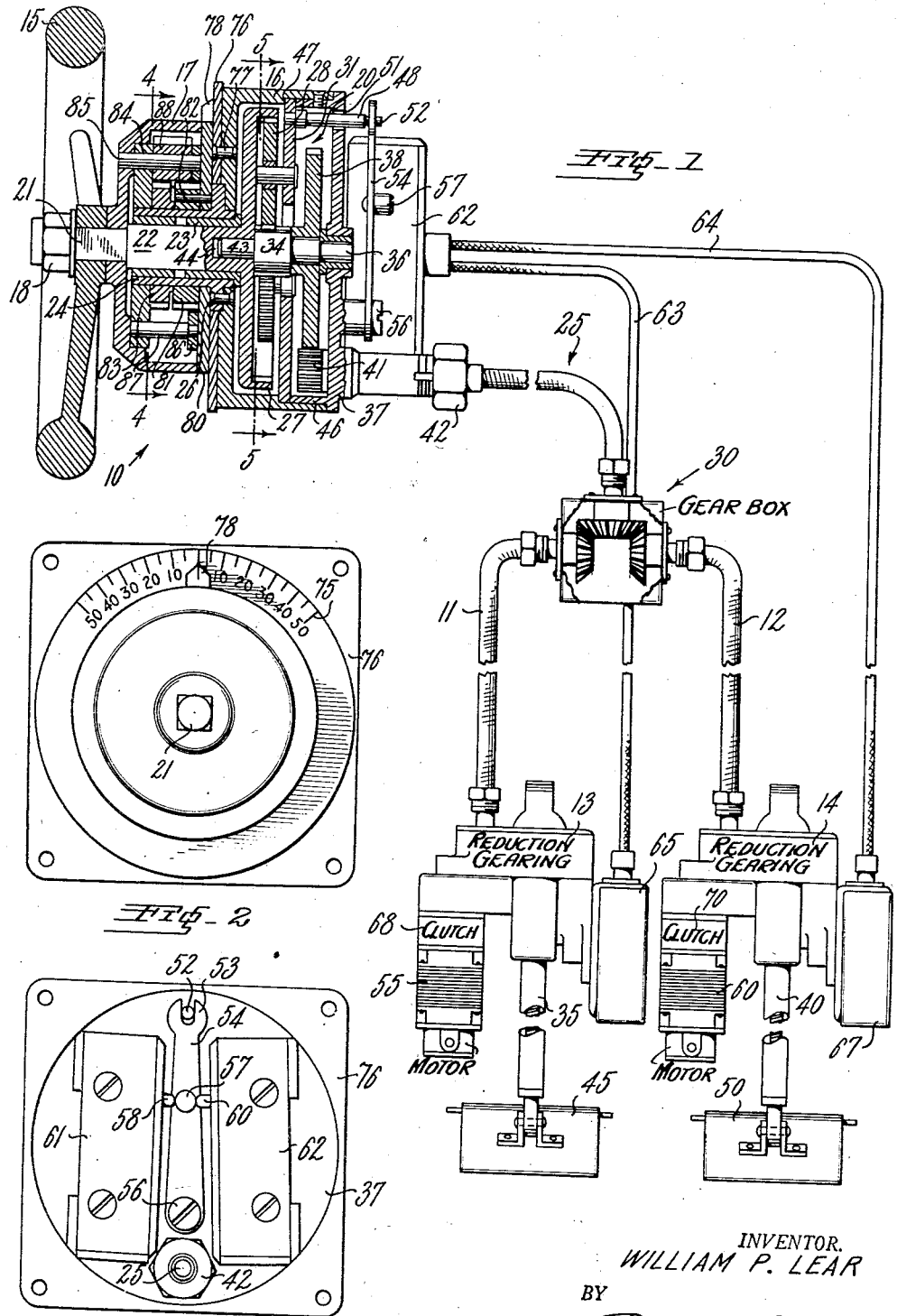
INVENTOR.
WILLIAM P. LEAR
BY Richard A. Marsen
ATTORNEY Patented Mar. 16, 1948

2,438,061

UNITED STATES PATENT OFFICE 2,438,061

REMOTE POSITIONING CONTROL

William P. Lear, North Hollywood, Calif., assignor, by mesne assignments, to Lear, Incorporated, Grand Rapids, Mich., a corporation of Illinois Application September 27, 1943, Serial No. 503,872

14 Claims. (Cl. 74—407)

This invention relates to remote positioning and indicating systems, and more particularly to such system in which actuation of a manual drive means effects energization of a power drive means to control the position of a driven member in accordance with the amount of movement of the manual drive means and to a novel compact control and indicating unit.

The present invention is particularly adapted to remotely position and indicate the position of aircraft accessories such as landing gear, wing flaps, ailerons and so forth. Aboard the larger aircraft, such acsessories are usually actuated by power driving means, and are frequently actuated in pairs. It is important that both accessories of such a pair be actuated in synchronism. To provide insurance against failure of the power drive means, it is desirable to provide for manually actuating these accessories. It is also desirable to indicate at a position remote from the member, such as adjacent the pilot's compartment, the relative actuated position of the driven member or members. In the present invention, the indicator and one or more actuating means are mechanically interconnected so that the actuating means cannot get out of synchronism with each other or with the indicator.

It is among the objects of this invention to provide a position and indicating system in which a manual driving means is at all times effective to actuate a driven member, and a power driving means is associated with the driven member and normally effective, upon actuation of the manual driving means, to position the driven member in accordance with the amount of movement of the manual driving means; to provide such a system in which a continuous indication of the position of the driven member is provided under all circumstances, irrespective of whether the driven member is power actuated or manually actuated; to provide a motor assisted manual drive system in which actuation of the manual driving member effects selective operation of control switches for energizing an electric motor to actuate a driven system in accordance with the direction and amount of movement of the manual driving means; to provide a novel motor assisted manual driving system connected to a driven system through planetary gearing, in which the planetary gearing includes a member movable, upon actuation of the manual drive means, to selectively close either one of a pair of switches for energizing one or more electric motors; and to provide a compact control and indicating unit including planetary and differential gearing adapted to connect a manual drive means and a position indicator to each other and to one or more driven members.

These and other objects, advantages and features of the invention will be apparent from the following description and the accompanying drawings. In the drawings:

Fig. 1 is a schematic illustration of a typical system embodying the present invention.

Fig. 2 is a front view of a position indicator forming part of the invention.

Fig. 3 is a rear view of the compact control unit forming part of the invention.

Fig. 4 is a cross-sectional view on the line 4—4 of Fig. 1.

Fig. 5 is a cross-sectional view on the line 5—5 of Fig. 1.

Fig. 6 is a schematic wiring diagram illustrating a preferred electrical circuit of the invention.

Fig. 7 is a diagrammatic illustration of a preferred mechanical interconnection of the invention system.

Generally speaking, the present invention includes a control unit including a combined manual driving means and position indicator connected through suitable driving mechanism such as flexible shafting, to one or more actuators effective to position a driven member, such as an aircraft accessory. Power driving means, such as electric motors, are provided and adapted to be selectively connected to the actuators through the medium of suitable means such as electromagnetic clutches. Control means are provided for each of the power driving means and are remotely connected to control switches operatively associated with the manual driving means of the control unit. The arrangement is such that actuation of the manual driving means in either direction will cause energization of the power driving means to actuate the movable members in the direction indicated by the movement of the manual drive means and to the extent of movement thereof. A continuous indication of the position of the actuated member is provided through mechanical connections between the position indicator, the manual drive means and the actuators for the driven members.

Referring more particularly to Figs. 1 and 7 of the drawing, the system of the invention includes a compact combined manual driving means, position indicator and power driving means control unit 10. The manual driving means comprises a handwheel 15 connected through planetary gearing 20 to driving mechanism such as flexible shafting 25. Flexible shafting 25 is connected to a T-drive 30 which is in turn connected by flexible shafting 11 and 12 to reduction gearing included in housings 13 and 14, respectively. The gearing in housings 13 and 14 is connected to jack screw actuators 35 and 40 adapted to position driven members such as airplane wing flaps indicated at 45 and 50. Suitable power driving means, such as electric motors 55 and 60, are adapted to be selectively connected to actuators 35 and 40, respectively, in a manner described more fully hereinafter.

Planetary gearing 20 for manual driving means 15 is mounted in the control unit 10 in a housing 16 to which is secured a relatively movable housing 17 enclosing the position indicating mechanism. Wheel 15 is secured by a nut 18 on the squared end 21 of a shaft 22. Shaft 22 is mounted, through the medium of a bushing 23, in a sleeve member 24 secured by rivets 26 to housing 16. An internal ring gear 27 is formed integral with shaft 22 and meshes with a plurality of planetary pinions 28 rotatably mounted on a movable mounting plate 31.

As shown more particularly in Fig. 5, planetary pinions 28 may be three in number and are provided with bushings 32 mounted on pins 33 secured in plate 31. Pinions 28 likewise mesh with a centrally located pinion 34 provided with a shaft 36 mounted in bearings in the end wall 37 of housing 16. A spur gear 38 is secured to shaft 36 and engages a pinion 41 which is connected through a coupling 42 to flexible shafting 25. The opposite end 43 of shaft 36 is mounted in a recess 44 in the inner end of shaft 22. Upon movement of wheel 15, ring gear 27 will rotate pinions 28 and thus drive pinion 34, spur gear 38, pinion 41 and shafting 25. Through the medium of the connections contained in drive box 30, this will cause operation of the gearing in housings 13 and 14 to effect movement of actuators 35 and 40 and thus of driven members 45 and 50.

Movable member 31 is mounted for a slight degree of rotation in housing 16, being retained in position between flange 46 on end wall 37 and a shoulder 47 on the housing 16. A pin 48 is secured to plate 31 and projects outwardly through an aperture 51 in end wall 37. The reduced outer end 52 of pin 51 engages the forked end 53 of a lever 54 pivotally mounted at 56 on end wall 37, as shown more particularly in Fig. 3. Lever 54 is provided with a roller 57 in engagement with the operating plungers 58 and 60 of a pair of switches 61 and 62 mounted on end wall 37. Electrical control cables 63 and 64 connect switches 61 and 62 to control boxes 65 and 67 containing switch means for controlling the operation of motors 55 and 60. Upon movement of wheel 15 in either direction, the torque exerted on plate 31 will cause a movement thereof which, through pin 51, will move lever 54. Roller 57 will thus depress one or the other of push-buttons 58 or 60 to close the corresponding switch 61 or 62. Closure of such switches will energize one of the motors 55 or 60.

Motors 55 and 60 are each provided with an electromagnetic clutch 68 or 70 which may be of the type described and claimed in my Patent No. 2,267,114 or my Patent No. 2,366,734, both assigned to the same assignee as this case. As fully shown and described in said patents, the clutches include a driving member connected to the motor and a driven member connected to gearing in housing 13, 14. My Patent No. 2,366,734, issued January 9, 1945, for "Multiple actuator system," and assigned to the same assignee as the present case, illustrates a typical arrangement of the gearing in housing 13, 14 and also illustrates a typical arrangement of clutches 68 or 70. In view of the above mentioned patents, it is not believed necessary to further illustrate or describe the clutch mechanism or the specific gearing arrangement used in the present construction.

Another typical gearing arrangement for housings 13, 14 is illustrated in copending application Serial No. 483,515, filed April 17, 1943, for "Unitary mechanical actuator system" and assigned to the same assignee as the present case. The gearing in drive box 30 is a typical right-angle gear drive. Such a gear drive is illustrated, for instance, at 45 in Fig. 1 of the above identified Patent 2,366,734, and as such right-angle gear drives are well-known to those skilled in the art, specific illustration and description thereof is not believed necessary in the present invention.

Clutches 68 and 70 are energized upon energization of the respective motors 55 and 60, and act to connect the motors to the gearing contained in housings 13 or 14, respectively, and thus to actuators 35 or 40. Clutches 68 and 70 are quick disconnecting, the driven member of the clutch being snapped out of engagement with the driving member substantially instantly upon deenergization of the associated motor. Such quick disconnection results in smooth control of driven elements 45 and 50.

Accordingly, when handle 15 is moved, the corresponding motor 55 or 60 is energized and connected to actuators 35 or 40 to effect movement of members 45 or 50. The particular motor remains energized during continued movement of handle 15, as such continued movement continues to impose a torque upon plate 31 and thus maintains one of the switches 61 or 62 closed, depending upon the direction of movement of handle 15. If motors 55 or 60 tend to cause actuation of flexible shafting 25 faster than such actuation is caused by handle 15, a reverse torque will be applied to plate 31 causing the same to move the lever 54 back to a central position opening the previously closed switch 61 or 62. Motors 55 or 60 thus move driven members 45 or 50 only to the extent indicated by movement of handle 15.

Upon deenergization of either of the motors, its electromagnetic clutch 68 or 70 is simultaneously deenergized to effect substantially instantaneous disconnection of the motor from its associated gearing and actuator. If desired, clutches 68 or 70 may be of the type described and claimed in my copending application Serial No. 552,442, filed September 2, 1944, in which a brake surface is provided and is adapted to be engaged by the driven disk of the clutch upon deenergization thereof, and during the time that the motor is coasting to a stop. Such engagement of the driven disk with the brake surface effects substantially instantaneously stopping of the associated actuator. However, when the motor has coasted substantially to a stop, the clutch described in said copending application is so arranged that the frictional engagement between the driven member and the brake surface is substantially eliminated. Thereby, actuators 35 or 40 may be driven through manual drive means 15 without the load of motors 55 or 60 being imposed upon the system. In the present arrangement, each motor is completely disconnected from the system upon deenergization, and its driven disk is freely rotatable by the manual driving means.

As driven members 45 and 50 are moved to different positions, such positions are indicated by mechanism contained within housing 17 of control unit 10. This mechanism comprises a series of indicia 75 on a plate 76 as shown in Fig. 2. Plate 76 is secured to the housing 16 by rivets 77. Cooperating with indicia 75 is a pointer 78 on a plate 80 rotatably mounted on sleeve 24. Plate 80 is pinned to a spur gear 81 by a pin 82. Adjacent spur gear 81 is a spur gear 83 fixed on sleeve 24. Arranged in front of gear 83 is a plate 84, rotatably mounted on sleeve 24 and secured to housing 17 by a pin 85. The other end of pin 85 is secured in a mounting ring 86. A series of pins 87 also connect plate 84 to ring 86. A pinion 88 is rotatably mounted on pin 85 and meshes with gears 81 and 83. One of gears 81 and 83, preferably relatively movable gear 81, is provided with at least one less gear tooth than the other gear 83. The indicating arrangement is substantially similar to that described and claimed in my copending application Serial No. 504,259 filed September 29, 1943 entitled "Remote control and indicator system" and assigned to the assignee of the present application. Accordingly, as handle 15 and housing 17 are rotated, plate 84 will rotate therewith and thus pinion 83 will revolve around gears 81 and 83. For each revolution of pinion 88, movable gear 81 will be displaced relative to fixed gear 83 by a distance corresponding to the number of teeth difference between the gears. This will move plate 80 and pointer 78 a corresponding amount.

Plate 84 is moved by shaft 22 through the medium of housing 17. The indicating mechanism is therefore directly connected to actuators 35 and 40 and thus to driven members 45 and 50. Any motion of driven members 45 and 50 is transmitted to the indicating mechanism through planetary gearing 20, irrespective of whether such a motion is effected manually or by electric motors 55 or 60. Due to the mechanical interconnection of the indicating mechanism in housing 17, and actuators 35 and 40, all of these elements are maintained in synchronism at all times. Therefore, pointer 78 in cooperation with indicia 75 accurately indicates the postion of members 45 and 50 throughout their range of movement. Thus, the interconnecting mechanical cables 11, 12 and 25 maintain actuators 35 and 40 in synchronism with each other and with control unit 10 at all times.

Fig. 6 is a wiring diagram illustrating a preferred circuit arrangement for motors 55 or 60. Each motor comprises an armature 90 and oppositely wound field windings 91 and 92, one of which is used for each direction of rotation. In series with the armature is a winding 93 for electromagnetic clutch 68 or 70. As shown, switches 61 and 62 are connected in parallel to one terminal 94 of a suitable source of current, which may be the 24 volt battery which is usually carried aboard aircraft. When handle 15 is moved, either switch 61 or switch 62 is closed, by engagement of roller 57 with plungers 58 or 60. The closure of either one of these switches will energize the motors through either pair of field windings 91 or 92 and clutch coils 93. A conductor 95 connects the opposite terminal of coils 93 to the other terminal 96 of the source of current.

It will be noted that the invention provides a compact control and indicating unit, in which the gearing connecting manual drive means 15 to driving mechanism 25, and the indicator gearing, are all enclosed in a single housing. Such a compact arrangement is particularly important for aircraft installations where space is often at a premium.

While a specific embodiment of the invention has been shown and described for the purposes of illustration, it will be obvious to those skilled in the art that the invention might be otherwise embodied without departing from such principles.

What is claimed is:

1. A remote position controlling and indicating system comprising, in combination, a driven member; an actuator operatively associated with said driven member; power driving means; mechanism effective upon energization of said power driving means to connect the same to said actuator; a manual driving device; driving mechanism connected to said actuator; planetary gearing connecting said manual driving device to said driving mechanism, said planetary gearing including a gear connected to said manual driving device, a gear connected to said driving mechanism, a movable element, and planetary pinions mounted on said movable element and operatively interconnecting said gears; and switch means operatively associated with said movable element and effective, upon actuation of said manual driving device, to energize said power driving means and operate said driven member.

2. A remote position controlling and indicating system comprising, in combination, a driven member; an actuator operatively associated with said driven member; an electric motor; mechanism effective upon energization of said electric motor to connect the same to said actuator; a manual driving device; driving mechanism connected to said actuator; planetary gearing connecting said manual driving device to said driving mechanism, said planetary gearing including a gear connected to said manual driving device, a gear connected to said driving mechanism, a movable element, and planetary pinions mounted on said movable element and operatively interconnecting said gears; and switch means operatively associated with said movable element and effective, upon actuation of said manual driving device, to energize said electric motor and operate said driven member.

3. A remote position controlling and indicating system comprising, in combination, a driven member; an actuator operatively associated with said driven member; power driving means; clutch means effective upon energization of said power driving means to connect the same to said actuator; a manual driving device; driving mechanism connected to said actuator; planetary gearing connecting said manual driving device to said driving mechanism, said planetary gearing including a gear connected to said manual driving device, a gear connected to said driving mechanism, a movable element, and planetary pinions mounted on said movable element and operatively interconnecting said gears; switch means operatively associated with said movable element and effective, upon actuation of said manual driving device, to energize said power driving means; and apparatus operatively associated with said gearing and effective to indicate the operated position of said driven member.

4. A remote position controlling and indicating system comprising, in combination, a driven member; an actuator operatively associated with said driven member; an electric motor; an electromagnetic clutch effective upon energization of said electric motor to connect the same to said actuator; a manual driving device; driving mechanism connected to said actuator; planetary gearing connecting said manual driving device to said driving mechanism, said planetary gearing including a gear connected to said manual driving device, a gear connected to said driving mechanism, a movable element, and planetary pinions mounted on said movable element and operatively interconnecting said gears; switch means operatively associated with said movable element and effective, upon actuation of said manual driving device, to energize said electric motor; and apparatus operatively associated with said gearing and effective to indicate the operated position of said driven member.

5. A remote position controlling and indicating system comprising, in combination, a driven member; an actuator operatively associated with said driven member; power driving means; mechanism effective upon energization of said power driving means to connect the same to said actuator; a housing; a manual driving device mounted on said housing; driving mechanism connected to said actuator; planetary gearing mounted in said housing connecting said manual driving device to said driving mechanism, said planetary gearing including a gear connected to said manual driving device, a gear connected to said driving mechanism, a movable element, and planetary pinions mounted on said movable element and operatively interconnecting said gears; a pair of switches mounted on said housing and connected in the energizing circuit of said power driving means; an operating lever for said switches pivotally mounted on said housing between said switches; and means connecting said movable element to said operating lever; said movable element, upon actuation of said manual driving device, actuating said lever to operate one of said switches to energize said power driving means and operate said driven member.

6. A remote position controlling and indicating system comprising, in combination, a driven member; an actuator operatively associated with said driven member; an electric motor; mechanism effective upon energization of said electric motor to connect the same to said actuator; a housing; a manual driving device mounted on said housing; driving mechanism connected to said actuator; planetary gearing mounted in said housing connecting said manual driving device to said driving mechanism, said planetary gearing including a gear connected to said manual driving device, a gear connected to said driving mechanism, a movable element, and planetary pinions mounted on said movable element and operatively interconnecting said gears; a pair of switches mounted on said housing and connected in the energizing circuit of said electric motor; an operating lever for said switches pivotally mounted on said housing between said switches; and means connecting said movable element to said operating lever; said movable element, upon actuation of said manual driving device, actuating said lever to operate one of said switches to energize said electric motor and operate said driven member.

7. A remote position controlling and indicating system comprising, in combination, a driven member; an actuator operatively associated with said driven member; power driving means; clutch means effective upon energization of said power driving means to connect the same to said actuator; a housing; a manual driving device mounted on said housing; driving mechanism connected to said actuator; planetary gearing mounted in said housing connecting said manual driving device to said driving mechanism, said planetary gearing including a gear connected to said manual driving device, a gear connected to said driving mechanism, a movable element, and planetary pinions mounted on said movable element and operatively interconnecting said gears; a pair of switches mounted on said housing and connected in the energizing circuit of said power driving means; an operating lever for said switches pivotally mounted on said housing between said switches; and apparatus operatively associated with said gearing and effective to indicate the operated position of said driven member; said movable element, upon actuation of said manual driving device, actuating said lever to operate one of said switches to energize said power driving means and operate said driven member.

8. A remote position controlling and indicating system comprising, in combination, a driven member; an actuator operatively associated with said driven member; an electric motor; an electromagnetic clutch effective upon energization of said electric motor to connect the same to said actuator; a housing; a manual driving device mounted on said housing; driving mechanism connected to said actuator; planetary gearing mounted in said housing connecting said manual driving device to said driving mechanism, said planetary gearing including a gear connected to said manual driving device, a gear connected to said driving mechanism, a movable element, and planetary pinions mounted on said movable element and operatively interconnecting said gears; a pair of switches mounted on said housing and connected in the energizing circuit of said electric motor; an operating lever for said switches pivotally mounted on said housing between said switches; means connecting said movable element to said operating lever; and apparatus operatively associated with said gearing and effective to indicate the operated position of said driven member; said movable element, upon actuation of said manual driving device, actuating said lever to operate one of said switches to energize said electric motor and operate said driven member.

9. A remote position controlling and indicating system comprising, in combination, a driven member; an actuator operatively associated with said driven member; an electric motor; an electromagnetic clutch effective upon energization of said electric motor to connect the same to said actuator; a manual driving device; driving mechanism connected to said actuator; planetary gearing connecting said manual driving device to said driving mechanism, said planetary gearing including a gear connected to said manual driving device, a gear connected to said driving mechanism, a movable element, and planetary pinions mounted on said movable element and operatively interconnecting said gears; switch means operatively associated with said movable element and effective, upon actuation of said manual driving device, to energize said electric motor; and apparatus operatively associated with said gearing and effective to indicate the operated position of said driven member and operate said driven member; said apparatus including a movable indicator and differential gearing connecting said manual driving device to said indicator.

10. A remote position controlling and indicating system comprising, in combination, a driven member; an actuator operatively associated with said driven member; power driving means; clutch means effective upon energization of said power driving means to connect the same to said actuator; a housing; a manual driving device mounted on said housing; driving mechanism connected to said actuator; planetary gearing mounted in said housing connecting said manual driving device to said driving mechanism, said planetary gearing including a gear connected to said manual driving device, a gear connected to said driving mechanism, a movable element, and planetary pinions mounted on said movable element and operatively interconnecting said gears; a pair of switches mounted on said housing and connected in the energizing circuit of said power driving means; an operating lever for said switches pivotally mounted on said housing between said switches; and apparatus operatively associated with said gearing and effective to indicate the operated position of said driven member; said movable element, upon actuation of said manual driving device, actuating said lever to operate one of said switches to energize said power driving means and operate said driven member; said apparatus including indicia on said housing, an indicator movably mounted on said housing, a gear member secured to said indicator, a gear member secured to said housing, one of said gear members having less gear teeth than the other, and a pinion secured to said manual driving device and revolvable about the peripheries of said gear members to cause relative movement of the same.

11. A remote position controlling and indicating system comprising, in combination, a driven member; an actuator operatively associated with said driven member; an electric motor; an electromagnetic clutch effective upon energization of said electric motor to connect the same to said actuator; a housing; a manual driving device mounted on said housing; driving mechanism connected to said actuator; planetary gearing mounted in said housing connecting said manual driving device to said driving mechanism, said planetary gearing including a gear connected to said manual driving device, a gear connected to said driving mechanism, a movable element, and planetary pinions mounted on said movable element and operatively interconnecting said gears; a pair of switches mounted on said housing and connected in the energizing circuit of said electric motor; an operating lever for said switches pivotally mounted on said housing between said switches; means connecting said movable element to said operating lever; and apparatus operatively associated with said gearing and effective to indicate the operated position of said driven member; said movable element, upon actuation of said manual driving device, actuating said lever to operate one of said switches to energize said electric motor and operate said driven member; said apparatus including indicia on said housing, an indicator movably mounted on said housing, a gear member secured to said indicator, a gear member secured to said housing, one of said gear members having less gear teeth than the other, and a pinion secured to said manual driving device and revolvable about the peripheries of said gear members to cause relative movement of the same.

12. A compact position selecting and indicating control unit comprising, in combination a housing; a manual driving device mounted on said housing; a driven member mounted in said housing and adapted to be connected to driving mechanism; planetary gearing mounted in said housing and operatively connecting said manual driving device to said driven member; said planetary gearing including a normally stationary element movable through a limited range upon actuation of said manual driving device; power supply control means mounted on said housing and arranged to control the energization of power driving means associated with such driving mechanism; indicating mechanism on said housing operative to indicate the position of a movable member connected to such driving mechanism; and differential gearing in said housing connecting said manual driving device and said driven member to said indicating mechanism.

13. A compact position selecting and indicating control unit comprising, in combination a housing; a manual driving device mounted on said housing; a driven member mounted in said housing and adapted to be connected to driving mechanism; a planetary gearing mounted in said housing and operatively connecting said manual driving device to said driven member; said planetary gearing including a normally stationary element movable through a limited range upon actuation of said manual driving device; power supply control means mounted on said housing and arranged to control the energization of power driving means associated with such driving mechanism; indicating mechanism on said housing operative to indicate the position of a movable member connected to such driving mechanism; differential gearing in said housing connecting said manual driving device and said driven member to said indicating mechanism; said differential gearing including a gear secured to said housing; a gear movable mounted in said housing and secured to said indicating mechanism; one of said gears having less teeth than the other; and a pinion secured to said manual driving device and revolvable about the peripheries of said gears to cause relative movement thereof.

14. A compact position selecting and indicating control unit comprising, in combination a housing; a manual driving device mounted on said housing; a driven member mounted in said housing and adapted to be connected to driving mechanism; planetary gearing mounted in said housing and operatively connecting said manual driving device to said driven member; said planetary gearing including a normally stationary element movable through a limited range upon actuation of said manual driving device; power supply control means mounted on said housing and arranged to control the energization of power driving means associated with such driving mechanism; indicating mechanism on said housing operative to indicate the position of a movable member connected to such driving mechanism; differential gearing in said housing connecting said manual driving device and said driven member to said indicating mechanism; said indicating mechanism including indicia on said housing and an indicator movably mounted on said housing and cooperative with said indicia; said differential gearing including a gear secured to said housing; a gear movably mounted in said housing and secured to said indicator; one of said gears having less teeth than the other; and a pinion secured to said manual driving device and revolvable about the peripheries of said gears to cause relative movement thereof.

WILLIAM P. LEAR.

REFERENCES CITED

The following references are of record in the file of this patent:

UNITED STATES PATENTS

| Number | Name | Date |
| --- | --- | --- |
| 1,472,257 | Titteringtor | Oct. 30, 1923 |
| 2,045,775 | Hodgman | June 30, 1936 |
| 2,206,875 | Chafee | July 9, 1940 |
| 2,284,353 | Allen | May 26, 1942 |
| 2,345,418 | Neuner | Mar. 28, 1944 |
| 2,366,734 | Lear | Jan. 9, 1945 |